(12) United States Patent
Shaffer et al.

(10) Patent No.: US 6,434,222 B1
(45) Date of Patent: Aug. 13, 2002

(54) APPARATUS AND METHOD FOR AUTOMATED MULTI-MEDIA MESSAGING SYSTEM INFORMATION UPDATING

(75) Inventors: Shmuel Shaffer, Palo Alto; William Joseph Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/062,501

(22) Filed: Apr. 17, 1998

(51) Int. Cl.[7] .............................. H04M 1/64; H04M 3/42
(52) U.S. Cl. ................ 379/88.13; 379/67.1; 379/88.19; 379/88.23; 379/88.27; 379/201.02
(58) Field of Search ........................... 379/67.1, 70, 76, 379/88.01, 88.08, 88.12, 88.13, 88.16, 69, 88.04, 88.09, 88.14, 88.19–88.21, 88.22–88.25, 88.27, 15.03, 100.05, 201.01, 201.02, 201.03, 201.12; 455/415, 417, 445, 461, 412, 414

(56) References Cited

U.S. PATENT DOCUMENTS

| | | | |
|---|---|---|---|
| 5,193,110 A | | 3/1993 | Jones et al. ................... 379/94 |
| 5,243,643 A | | 9/1993 | Sattar et al. ................... 379/88 |
| 5,333,266 A | | 7/1994 | Boaz et al. ................... 395/200 |
| 5,434,908 A | * | 7/1995 | Klein ........................... 379/88 |
| 5,517,652 A | | 5/1996 | Miyamoto et al. ............ 395/800 |
| 5,561,703 A | | 10/1996 | Arledge et al. ................ 379/57 |
| 5,568,540 A | | 10/1996 | Greco et al. ................... 379/89 |
| 5,577,041 A | | 11/1996 | Sharma et al. ................. 370/79 |
| 5,608,786 A | * | 3/1997 | Gordon ....................... 379/100 |
| 5,647,002 A | | 7/1997 | Brunson ........................ 380/49 |
| 5,675,507 A | * | 10/1997 | Bobo, II .................. 364/514 R |
| 5,742,905 A | * | 4/1998 | Pepe et al. ................... 455/461 |
| 5,768,513 A | * | 6/1998 | Kuthyar et al. ........ 395/200.34 |
| 5,802,157 A | * | 9/1998 | Clarke et al. ................ 379/196 |

* cited by examiner

*Primary Examiner*—Allan Hoosain

(57) ABSTRACT

A system (100) that employs media "blending" to notify a multi-media user of the use of one or more default configurations and provides an opportunity to record or reconfigure the item for the future. In particular, a system (100) according to the present invention monitors usage of a default or other predetermined setting and provides a message to the user indicative of its usage. Once the user has been notified of the usage, the user is given the option of reconfiguring from the default setting.

20 Claims, 5 Drawing Sheets

APPARATUS AND METHOD FOR AUTOMATED MULTI-MEDIA MESSAGING SYSTEM INFORMATION UPDATING

BACKGROUND OF THE INVENTION

1. Field of the Invention

The present invention relates to a multi-media messaging system, and in particular, to a system and method for configuration of a multi-media messaging system.

2. Description of the Related Art

Modern multi-media messaging systems allow users to access messages of a variety of types, such as e-mail, voice mail and facsimile, at the same time. For example, a user may access e-mail, voice mail and facsimile from a mobile telephone or from a multi-media personal computer via the Internet. To do so, a single integrated mailbox for messages of a plurality of types may be provided. In a computer environment, for example, the computer may run a Windows-type messaging system, and be able to access messages of a variety of types by clicking an icon in a graphical user interface. Such systems thus provide mechanisms for converting messages of one type (e.g., voice) into a medium of another type (e.g., e-mail) for convenient retrieval.

As multi-media systems grow increasingly complex, users are provided with an increasing number of configurable parameters and recordable information. For example, default system greetings may be assigned when a mailbox is initially configured. However, the user may choose instead to record his or her own greeting. Similarly, a referral extension may be configured that allows for another person to take urgent calls.

As the number of such configurable parameters and recordable information increases, users are increasingly overwhelmed by the number of options available and fail to fully configure their systems for optimal performance. In particular, in order to configure all of a plurality of mailbox options, users typically must undertake an exhaustive menu review of all the options, picking and choosing the ones desired to be set up. This time commitment is disadvantageous in that users frequently skip over configuration options and so fail to optimally take advantage of their multi-media messaging systems.

Accordingly, there is a need for an improved method for setting configuration parameters in a multi-media messaging system.

SUMMARY OF THE INVENTION

These and other drawbacks in the prior art are overcome in large part by a system and method for a configuration system for a multi-media messaging system according to the present invention. The present system and method notifies a multi-media user of the conditions when various parameters, such as a personal greeting on a voice mail box, have not been configured and the system default configurations are executed. The system provides an opportunity to record or reconfigure the parameters. In particular, a system according to the present invention monitors execution of a default or other predetermined configurations or parameters and provides a message to the indicative thereof. Once the user has been notified of the execution of a default, the user is given the option of configuring the parameter or ignoring the message and allowing the system to continue executing the default parameter.

One embodiment of the present invention employs an integrated multi-media messaging system. The integrated multi-media messaging system includes an integrated mailbox which permits user access via a multi-media computer or telephone and/or facsimile. If a default setting has been employed, the multi-media messaging system generates a message which is delivered to the integrated mailbox. The integrated mailbox receives the message which indicates that the default setting has been employed. The user may then, either by clicking on a hypertext link or a system icon reset the default configuration.

BRIEF DESCRIPTION OF THE DRAWINGS

A better understanding of the present invention can be obtained when the following detailed description is considered in conjunction with the following drawings in which.

DETAILED DESCRIPTION OF THE INVENTION

Figure 1:
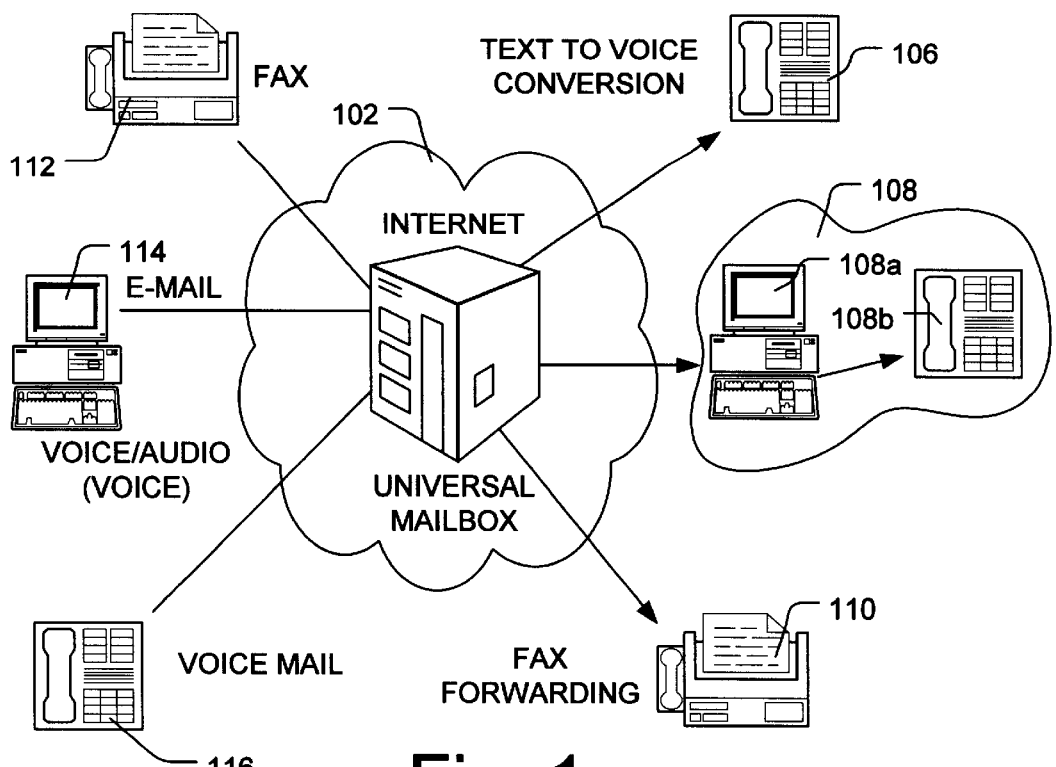
FIG. 1 is a block diagram of an exemplary multimedia messaging system according to an embodiment of the present invention.

Turning now to the drawings and with particular attention to FIG. 1, a diagram illustrating a multimedia messaging network system according to an embodiment of the present invention is illustrated. The multimedia messaging network system 100 is configured to support various protocols such as e-mail, voice-mail and fax messaging. In particular, as shown, the multimedia messaging network system 100 includes a network 102, such as a local area network (LAN) coupled to, for example, the Internet and the public switched telephone network (PSTN) (not shown). As shown, the present invention includes a central switch 104, such as a private branch exchange (PBX). The central switch 104 may be coupled to a local area network (LAN) server (not shown), to which a plurality of messaging entities are coupled. The central switch 104 includes a multimedia server 104a for voice, fax, e-mail, video messages and image annotations. As illustrated, a telephone 106 including text-to-voice conversion capabilities via the multimedia server 104a are provided as are fax machines 110, 112. The system may be configured to support fax forwarding, for example. In addition, standard voice mail may be provided to a telephone 116, and e-mail, including support for audio or video attachments may be provided to a computer 114. For example, the computer may be configured to support the Waveform and MIDI audio formats; the MPEG video format; and the JPEG, GIF, and BMP graphics formats. Thus, the computer 114 may include audio and/or video cards, as are well known. Additionally, a computer 108a may be coupled to the multimedia server 104a and a telephone 108b may further be coupled to the computer 108a. The computer/telephone 108 may employ the TAPI or TSAPI interface protocols, as is well known in the art. In addition, the computers 108a, 114 may include fax cards for facsimile functionality.

Figure 2:
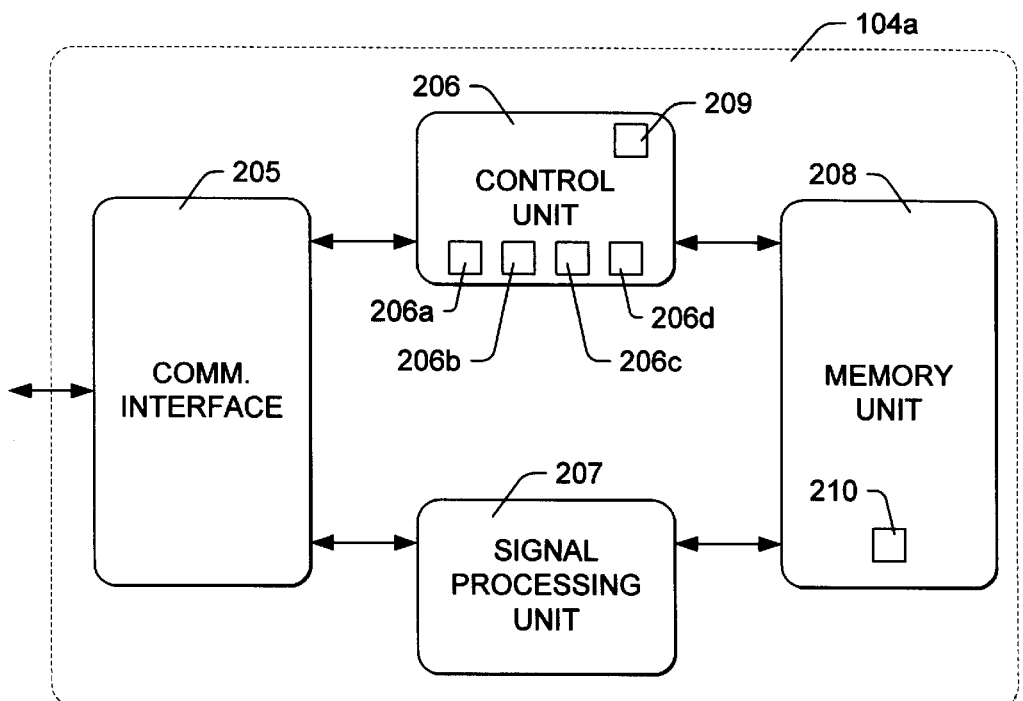
FIG. 2 is a block diagram of a multimedia messaging server according to an embodiment of the invention.

A more detailed block diagram illustrating the multimedia server 104a is shown in FIG. 2. In particular, the multimedia server 104a includes a communication interface 205, a real time signal processing unit 207, a memory unit 208 and a control unit 206 for controlling the real time signal processing device 207 and the memory unit 208. The control unit 206 may include a voice mail module 206a, an e-mail module 206b, a fax module 206c, and a paging module 206d. An integrated mailbox 210 accessible to a user, for example, from a PC, may be stored in the memory unit 208.

The voice mail module 206a is responsible for voice messaging functions, such as create, revise, send, forward, append, and a variety of other well-known functions. The voice mail module 206a may be embodied in any of a variety of known commercial platforms. Similarly, the e-mail module 206b drives the e-mail functions and allows access to the integrated mailbox 210 by the computers 108a, 114. Typical e-mail module 206b functions include create, revise, send, forward, and the like. The fax module 206c is responsible for coordinating receipt of fax messages, either to individual fax machines, such as the fax machines 110, 112, or to fax cards (not shown) within the computers 108a, 114. Again, the fax module 206c may have, among others, create, send and forward functions. The control module 206 may further support voice-to-text, text-to-voice, optical character recognition to text and text-to-optical character recognition functionality, which may be executed by the signal processing unit 207.

The communication interface unit 205 serves to send and receive a protocol, such as CSMA/CD, required for communicating with a user terminal, such as a computer 114 or telephone 106. The signal processing unit 207 operates to encode or decode the multimedia information such as video-voice images, handle a time axis, and edit and work on an image or voice. The memory unit 208 serves to store received data and edited data. The control unit 206 serves to write or read data from the file and control the editing of the data. More particularly, according to the present invention, the control unit 206 includes a configuration setup module 209, which is configured to provide system setup monitoring and provide setup options to a user, as will be described in greater detail below.

The voice mail module 206a, the e-mail module 206b, the fax module 206c, the paging module 206d, and the configuration setup module 209 may communicate with one another using an integrated message protocol, such as described in U.S. Pat. No. 5,333,266. Other known messaging protocols may be employed. While described as distinct modules, the configuration setup module 209, the fax module 206c, the e-mail module 206b, the paging module 206d and the voice mail module 206a may be embodied as software running on a microprocessor. Thus, FIG. 2 is exemplary only.

The discussion that follows uses the exemplary multimedia computer 114 as the basis for discussion, it being understood that any or all of the messaging entities as shown in FIG. 1 may be employed. For ease of discussion, however, the multimedia computer 114 is configured to employ e-mail, voice mail, telephony and facsimile processes. Thus, the multi-media computer 114 may be a PC compatible or Macintosh-type personal computer employing standard known audio and video cards and including microphones and speakers. In addition, the multimedia computer 114 may be configured for Internet access, such as via a modem or ISDN terminal adapter and employing a Web browser such as Microsoft Explorer or Netscape Navigator software.

Figure 3:
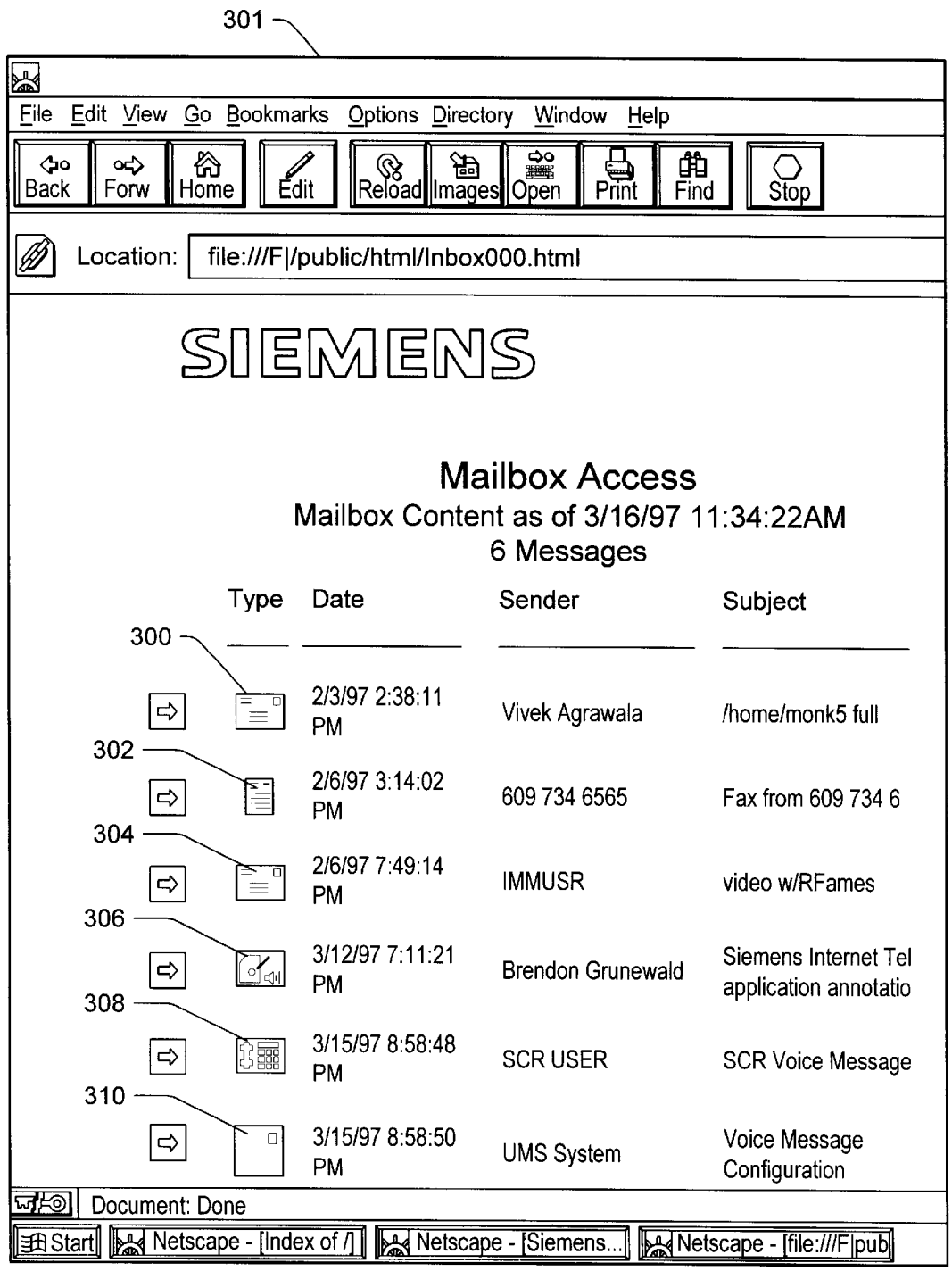
FIG. 3 is a diagram illustrating exemplary messaging GUI according to an embodiment of the invention.

For example, turning now to FIG. 3, a diagram illustrating a universal mailbox system graphical user interface 301 is shown. As illustrated, the message access may be accomplished via a Netscape Navigator web browser. The messaging server 104a, as discussed above, is configured to handle messages of a variety of types, such as e-mail messages represented by the icons 300, 304, facsimile messages represented by the icon 302, Internet telephony applications represented by the icon 306, and voice messages represented by the icon 308. Finally, as will be discussed in greater detail below, a message configuration message, such as a voice message configuration message, represented by the icon 310 may be provided according to the present invention. In particular, as illustrated, the voice message configuration message 310 may be generated by the messaging server 104a in response to detection of the use of a predetermined default setting, as will be described in greater detail below. Clicking the icon 310 allows the user to access a message identifying a way to change the system default configuration, as will be explained in greater detail below. It is noted that, while illustrated as a discrete message, the information contained in the configuration message 310 may be appended to a caller's message, either within the body, or as an attachment.

As discussed above, according to an embodiment of the present invention, the configuration setup interface 209 (FIG. 2) is configured to monitor incoming messages received via the communication interface 205. More particularly, the configuration setup interface 209 is configured to monitor the responses of the modules 206a–206d to incoming messages. For example, in the case of a received voice mail message, if the user has not set any user-specific configuration information, the system default greeting will be delivered to the caller. Thus, upon reception of a call, the voice messaging module 206a may access the memory 208 at a predetermined location for a user-defined greeting corresponding to a received user-identification. If no such user-defined greeting has been provided, the voice messaging module 206a accesses the memory 208 at a different location for the default system greeting. The caller will then leave a message, which will be stored by the system and will appear in the mailbox access window 300 (FIG. 3). For sake of illustration only, the voice message 308 appears. The configuration control module 209 monitors the voice mail control module's 206b accessing of the default system greeting, rather than using a user-defined greeting which would be stored at a different memory location. The configuration control module 209 then generates, for example, an e-mail message 310. The e-mail message 310 may identify in a subject line indicating that it relates to voice message configuration referring to the voice message 308. The text of the message may indicate that the user may record a personal greeting, for example, by clicking on a hypertext icon included in the accessed e-mail message 310. Alternatively, the configuration message may be provided as a voice message or as a facsimile message. Thus, FIG. 3 is exemplary only. The contents of the configuration e-mail message (or other type) are stored in a predetermined location in the memory 208. The configuration control module 209 retrieves the "canned" message, and forwards it to the recipient's mailbox.

Figure 4:
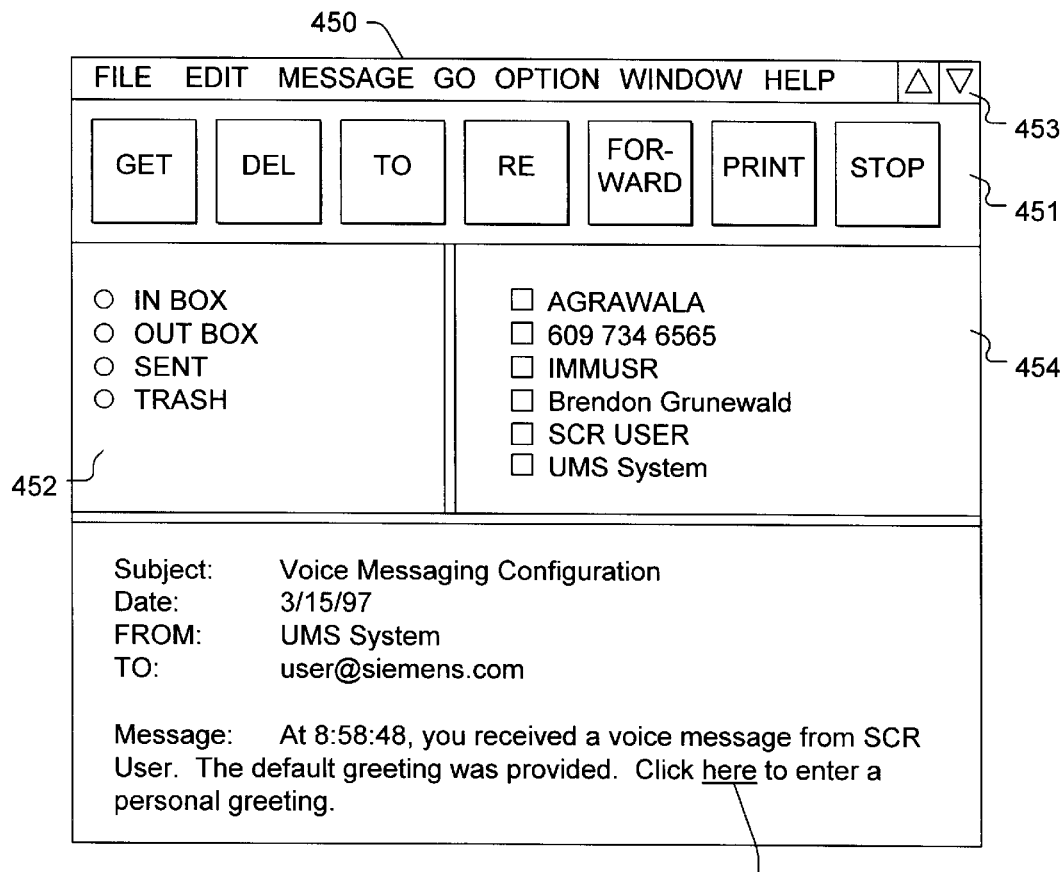
FIGS. 4–6 are exemplary graphical user interfaces representing configuration setup procedures according to an embodiment of the invention.

For example, turning now to FIG. 4, an exemplary graphical user interface 450 showing the result of clicking on the configuration message icon 310 is shown. As shown, the GUI may be written in HTML and viewable through a Web browser. It is noted, however, that standard Windows-type pop-up windows may be used. In particular, the graphical user interface 450 may include a menu bar 453 to provide access to file editing, etc. functions. In addition, a task bar 451 may be provided to allow a user to get mail, delete mail, send new mail, reply to mail, forward mail, print, and the like. As illustrated, the graphical user interface 450 includes a folder window 452 which may be used to define an in-box, an out-box, trash, sent mail, or other user-defined mail message folders as are known in the art. In addition, a message window 454 may be provided which lists the messages in a particular folder, highlighted in the mail folder window 452. As illustrated, the in-box folder is highlighted and the messages from the previous window (FIG. 3) are shown in the message window 454. Furthermore, the user may highlight a message in the message folder 454 causing it to appear in the window 456. As discussed above, in the example illustrated the user clicks on the icon 310 (FIG. 3) in response to reception of the voice message configuration message. The message in the window 456 is generated by the messaging server 104a. The message recites that "at 8:58:48 you received a voice message from SCRUSER. The default greeting was provided. Click here to enter a personal greeting." As shown, a hot icon 458 is provided to allow the user to click and access a configuration setup routine. It is noted that clicking on the icon 458 may pull up a local configuration program on the user's PC, which then transmits information to the messaging server 104a, or alternatively, accesses a Web page on a personal Intranet.

Figure 5:
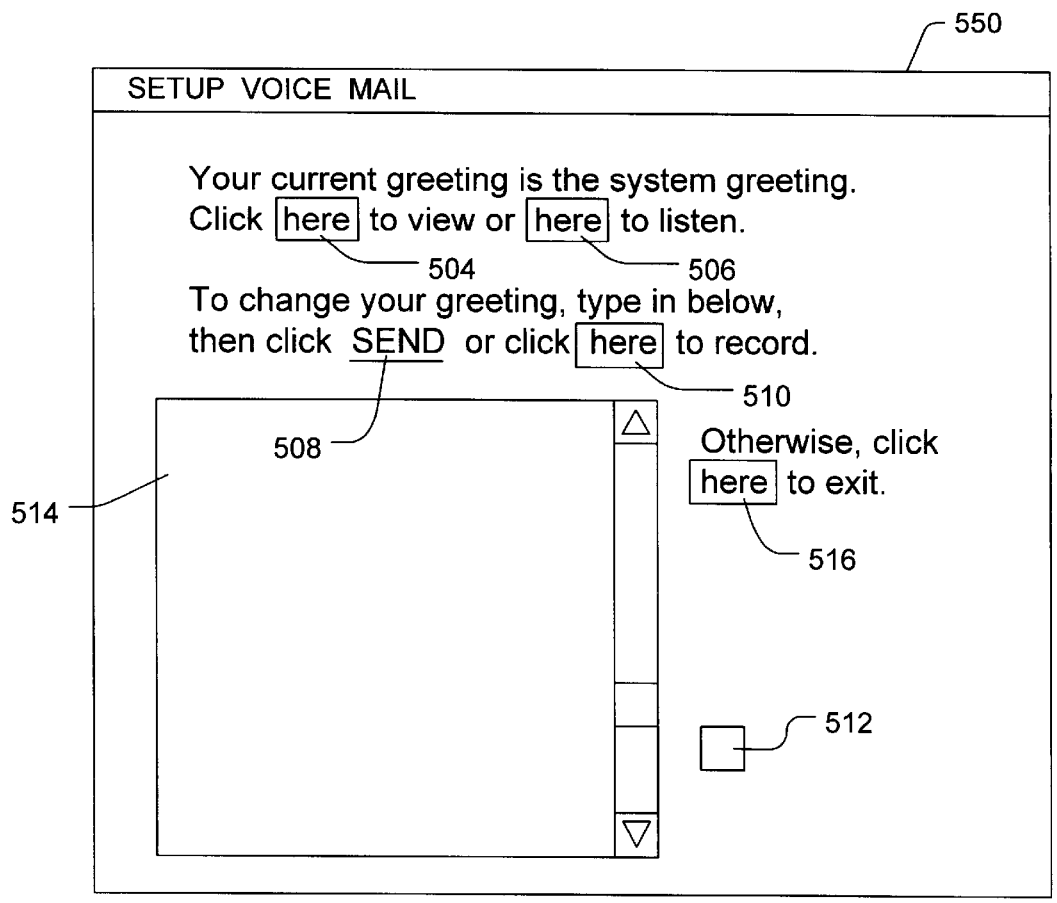

For example, turning now to FIG. 5, an exemplary graphical user interface which may appear responsive to clicking the icon 458 is illustrated. As shown, the setup graphical user interface 550 presents a greeting 502, informing the user of the current greeting. In addition, the option is given to the user to change the message either by typing in a message or by recording a message. Finally, the option is given to the user to exit without changing the system greeting, More particularly, a plurality of icons 504, 506, 508, 510 and 516 are provided allowing the user to select an option. For example, as shown, clicking the icon 504 allows the user to view the system greeting in text format. Clicking the icon 506 allows the user to listen to the system greeting. Clicking the icon 508 allows the user to type in a new user greeting in the window 514. Clicking the icon 508 or 512 allows the users to submit the message to the messaging system. Finally, clicking the icon 510 allows the user to record a message and then send to the system.

Figure 6:
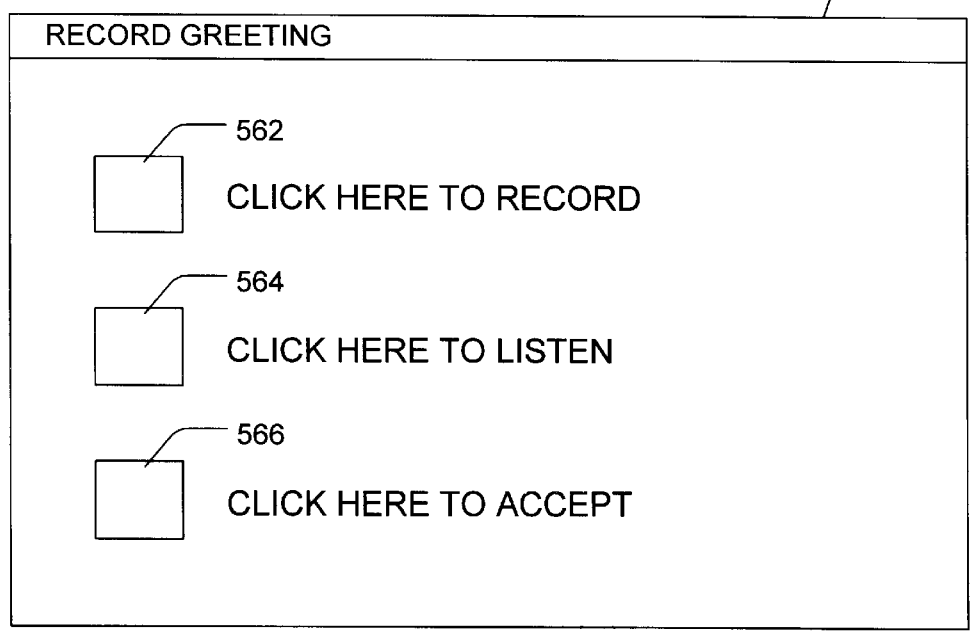

For example, turning now to FIG. 6, an exemplary graphical user interface 560 for recording a setup message via the computer is illustrated. For example, the graphical user interface 560 allows the user to click an icon 562 to record a message. Upon recording the message, the user may click the icon 564 to listen to the message and re-record by clicking the icon 562 if necessary. Finally, the user may click the icon 566 to accept the message which will then be sent to the messaging system for provision to callers.

As is well known, the integrated mailbox system keeps track of messages of each media type and coordinates their delivery to the accessing terminal 114. Such messaging systems are described in U.S. Pat. No. 5,333,266 and U.S. Pat. No. 5,568,540, which are herein incorporated by reference in their entirety as if fully set forth herein.

Figure 7:
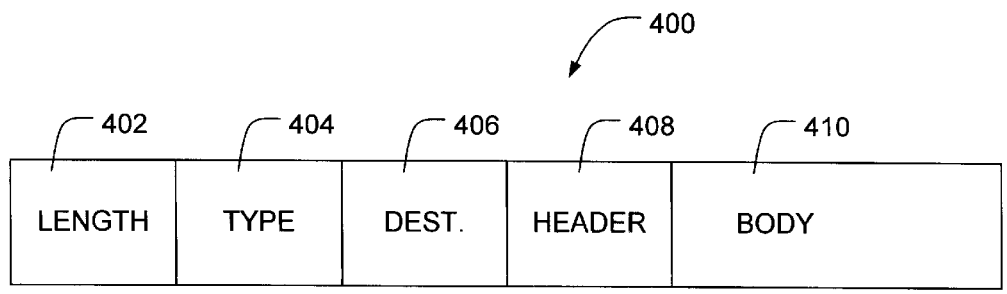
FIG. 7 is a diagram of a protocol element according to an embodiment of the invention.

For example, turning now to FIG. 7 a diagram of an exemplary general message format for a messaging protocol, which may be used in accordance with an embodiment of the present invention, is shown. The message element 400 is used to carry messages (or information about messages) from one module to the next. The message element 400 includes a length field 402, a type field 404, a destination field 406, a message header field 408 and a message body field 410. The message length field provides the length of the entire element 400. The message type field 404 identifies the type of message, i.e., e-mail, voice mail, fax and so forth. The destination field 406 is used by the recipient messaging module to route the message to the appropriate user's mailbox. The message header field 408 is used to provide a subject header as is known, and the message body field 410 is used to provide the body of the message. It is noted that the message body field 410 may include a message body convened from one format to another. For example, a voice message may be converted to a Waveform audio file format (specification available from Microsoft Corporation) and then transported to the appropriate module which provides the message to the appropriate user's multimedia PC. Alternatively, the conversion to the waveform audio file format may occur at the PC itself and the message body may be, for example, an audio file. Then, when the user clicks the appropriate icon, the PC will play the body of the message. In alternative embodiment, however, the body of the message, such as a voice message, may be converted to text using known voice-to-text converters. In such a case, the act of clicking the appropriate icon will then display the text of the message. In still an alternate embodiment, the message body itself is not provided to the alternative module. Instead, only a header is provided. Only after the appropriate icon is clicked will the body of the message be transferred.

Figure 8:
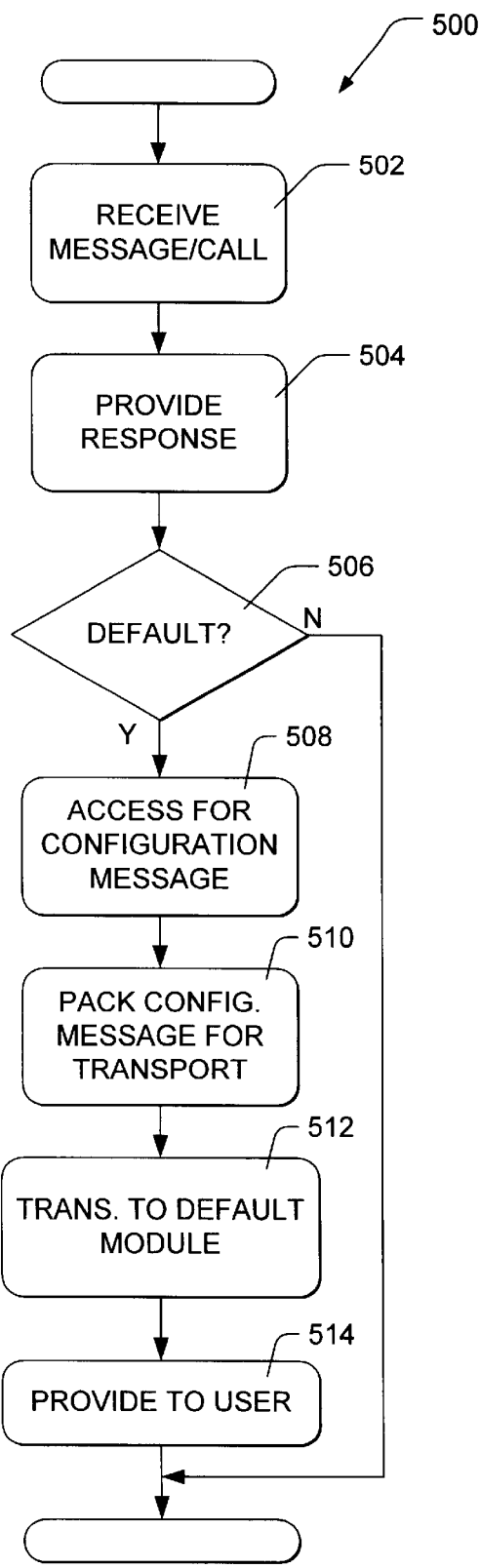
FIG. 8 is a flowchart illustrating operation of an embodiment of the invention.

Turning now to FIG. 8, a flowchart illustrating operation of an embodiment of the invention is shown. In particular, in a step 502, the multimedia messaging network system 100 receives a message or call from a calling party to a subscriber or user of the system. In a step 504, the multimedia messaging system provides a response to the call. The response includes, for example, connecting the call to the appropriate module 206a–206d. In a step 506, the system determines whether a default response has been provided to the caller. If a default response has been provided, then in a step 508 the configuration control module 209 accesses the memory 208 for an appropriate configuration message. As discussed above, the configuration message may include information concerning the received message to which it relates, as well as information as to how to reconfigure the messaging system. In a step 510, the configuration control module 209 packs the configuration message for transport to the appropriate destination control module 206a–206d. In a step 512, the configuration message is transported to the default module. Finally, in a step 514, the configuration message is provided to the user, in a known manner.

Figure 9:
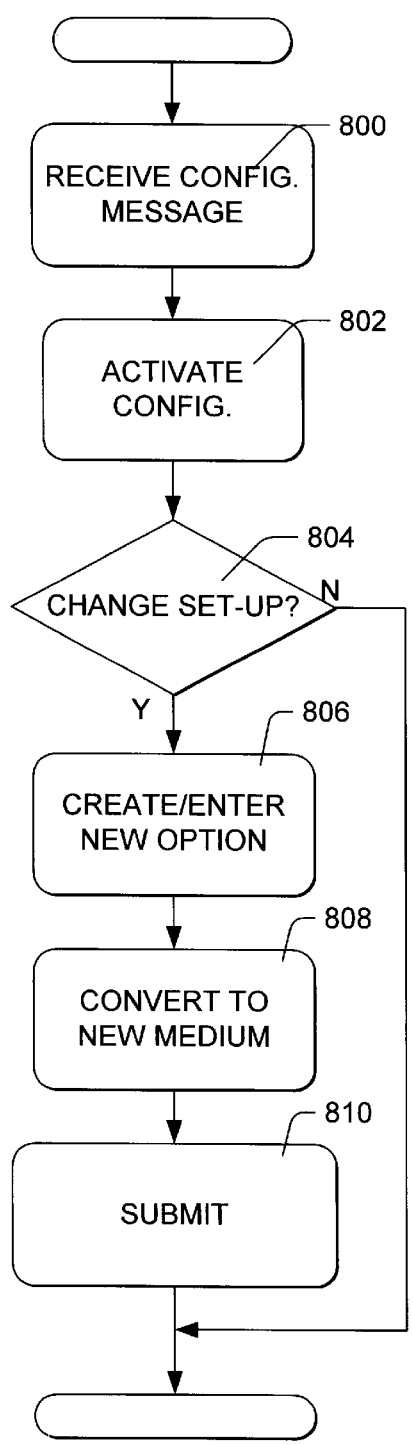
FIG. 9 is a flowchart illustrating operation of another embodiment of the invention.

Turning now to FIG. 9, a flowchart illustrating operation of another aspect of the invention is shown. In particular, in a step 800, a user receives a configuration message. For example, the reception of the configuration message may be on or via a mail program on a personal computer such as personal computer 114. In a step 802, the user may activate the configuration message. As discussed above, activation of a configuration message may include clicking on a hot icon within a e-mail message. It is noted that while discussed with respect to e-mail messages denoting configuration settings, the system may be configured to generate, for example, facsimile messages or phone mail messages indicating to the user that the configurations may be changed. In the case of facsimile messages, the user may be given directions as to how to change configuration settings, for example, the facsimile message may be the contents a program's HELP file. In the case of a voice mail voice configuration message, the user may be provided with a voice mail message instructing the user as to how to change the configuration settings. In step 804, the user is given the option of changing the system settings once the user has activated the configuration message. As discussed above, this may include the user clicking on an option to listen to the default message in order to decide whether or not to change the default message. If the user decides not to change the setup, the message and the system will terminate. Next, in a step 806 the user may create or enter the new option in a known manner. As discussed above, for example, in the case of a voice mail greeting, the user may either type in a greeting or record a greeting using the system microphone and associated software. In a step 808, the system may convert the greeting from one medium to another, for example, if the user had typed in the message, the system may convert the text to a voice response. Finally, in a step 810, the user may submit the file to the messaging server 104*a*. The messaging server 104*a* will then use the message or greeting as the system response.

The invention described in the above detailed description is not intended to be limited to the specific form set forth herein, but, on the contrary, is intended to cover such alternatives, modifications and equivalents as can reasonably be included within the spirit and scope of the appended claims.

What is claimed is:

1. A multi-media messaging system, comprising:

means for receiving messages of a plurality of types;

means for monitoring configuration parameters associated with said messages responsive to receiving said messages; and means for providing reconfiguration options in a separate message of one of said plurality of types to a user based on said associated configuration parameters and responsive to receiving an incoming message.

2. A multi-media messaging system according to claim 1, said providing means including means for providing said reconfiguration options in a message format different from that of a monitored message.

3. A multi-media messaging system according to claim 1, said providing means including means for providing said reconfiguration options in the same format as that of a monitored message.

4. A multi-media messaging system according to claim 1, wherein said reconfiguration options are provided via e-mail messages.

5. A multi-media messaging system according to claim 4, wherein said reconfiguration options are provided via hot links from e-mail messages.

6. A multi-media messaging system according to claim 1, wherein said monitoring means includes means for monitoring voice mail configuration parameters.

7. A multi-media messaging system according to claim 1, wherein said monitoring means includes means for monitoring telephone system configuration parameters.

8. A method for operating a multi-media messaging system, comprising:

receiving messages of a plurality of types;

monitoring configuration parameters associated with said messages responsive to receiving said messages; and providing reconfiguration options in a separate message of one of said plurality of types to a user based on said associated configuration parameters and responsive to receiving an incoming message.

9. A method for operating a multi-media messaging system according to claim 8, including providing said reconfiguration options in a message format different from that of a monitored message.

10. A method for operating a multi-media messaging system according to claim 8, said providing including providing said reconfiguration options in the same format as that of a monitored message.

11. A method for operating a multi-media messaging system according to claim 8, wherein said reconfiguration options are provided via e-mail messages.

12. A method for operating a multi-media messaging system according to claim 11, wherein said reconfiguration options are provided via hot links from e-mail messages.

13. A method for operating a multi-media messaging system according to claim 11, wherein said monitoring includes monitoring voice mail configuration parameters.

14. A method for operating a multi-media messaging system according to claim 11, wherein said monitoring includes monitoring telephone system configuration parameters.

15. A telecommunications control unit, comprising:

a plurality of multimedia modules adapted to handle messages of a plurality of types; and a configuration setup module adapted to monitor configuration parameters associated with said messages and automatically provide configuration options in a separate message of one of said types to a user based on said associated configuration parameters and responsive to receiving an incoming message.

16. A telecommunications control unit according to claim 15, wherein said configuration setup module provides said configuration options in a message format different from that of a monitored message.

17. A telecommunications control unit according to claim 15, wherein said configuration setup module provides said configuration options as e-mail messages.

18. A telecommunications control unit according to claim 17, wherein said configuration setup module provides said configuration options via hot links in said e-mail messages.

19. A telecommunications control unit according to claim 15, wherein said configuration setup module provides said configuration options via facsimile messages.

20. A telecommunications control unit according to claim 15, wherein said configuration setup module provides said configuration options via voice-mail messages.

* * * * *